Dec. 2, 1958 W. A. SCHMALL 2,862,441
TOASTER-OVEN COOKING APPLIANCE
Filed Dec. 9, 1954 2 Sheets-Sheet 2

Inventor:
Wilbur A. Schmall,
by Armand Cifelli
His Attorney.

United States Patent Office 2,862,441
Patented Dec. 2, 1958

2,862,441

TOASTER-OVEN COOKING APPLIANCE

Wilbur A. Schmall, Allentown, Pa., assignor to General Electric Company, a corporation of New York Application December 9, 1954, Serial No. 474,137

12 Claims. (Cl. 99—340)

This invention relates to cooking appliances, and particularly to a unitary, combination cooking appliance which is capable of functioning as a toaster or an oven.

Currently marketed cooking appliances, such as toasters, are extremely complicated structures, and due to the large number of components which go into them, are extremely expensive to manufacture. As a result, the toaster art is constantly striving to simplify toaster construction to thereby reduce the cost of manufacture.

In addition to being complicated, expensive structures, many currently marketed toasters have a serious deficiency in that they do not produce objects which have been toasted to a uniform color, i.e., even color over the toasted surfaces of the object. One reason for this is that many toasters cook by a combination of reflected energy and directly radiated energy, and these types of energy must be carefully controlled and delicately balanced, which is difficult, in order to toast uniformly. The toaster art directs a considerable amount of its attention to this particular problem and constantly strives to make improvements in this area, with the ultimate goal of providing a toaster which will toast to a completely uniform color.

Another deficiency in currently marketed toasters is that they are not capable of toasting objects which deviate from a relatively small predetermined thickness range. It is difficult to toast very thin objects and impossible to toast objects which exceed this range. It is apparent that in view of the large variety of available bread products that exceed this range, such as hamburger and frankfurter rolls, buns of numerous types and English muffins, it is extremely desirable for toasters to be able to toast such objects.

A further deficiency of known toasters is that provision is not normally made for merely warming objects as opposed to toasting them. It frequently occurs in most households that bread is toasted before a person is ready to eat it; at such a time it is desirable to have a warming feature in a toaster, i.e., means for maintaining toasted objects warm. This warming feature would have many uses other than maintaining toasted objects warm, for it could be used to warm cold rolls or buns, melt butter on bread or toast or grill sandwiches.

The enumerated deficiencies are exemplary of defects in known toasters and are some of the problems which my invention deals with.

It is an object of this invention to provide a cooking appliance which is simple in construction, inexpensive to produce, and easy to operate.

It is another object of this invention to provide a cooking appliance which is capable of consistently toasting objects to a uniform color.

It is a further object of this invention to provide a cooking appliance which is capable of toasting objects of thicknesses ranging from the thinnest sliced bread that is commercially available to objects as thick as hamburger buns or English muffins.

It is a still further object of this invention to provide a cooking appliance which is capable of functioning as either a toaster or a warming oven.

All of the objects of my invention are accomplished in one form by providing a cooking appliance having a toasting chamber, an oven chamber and means for selectively heating either of the chambers; the toasting chamber being so configured and the heating means being associated therewith in such a manner as to cook objects placed in the toasting chamber exclusively by uniformly dispersed, reflected energy, as opposed to directly radiated energy.

The above and other objects of my invention, and further details of that which I believe to be novel, will be clear from the following description and claims taken with the accompanying drawings wherein:

Figure 4 is a diagrammatic view showing the geometrical relationship of some of the parts of one form of the appliance and the manner in which the thermal energy is dispersed.

Figure 1:
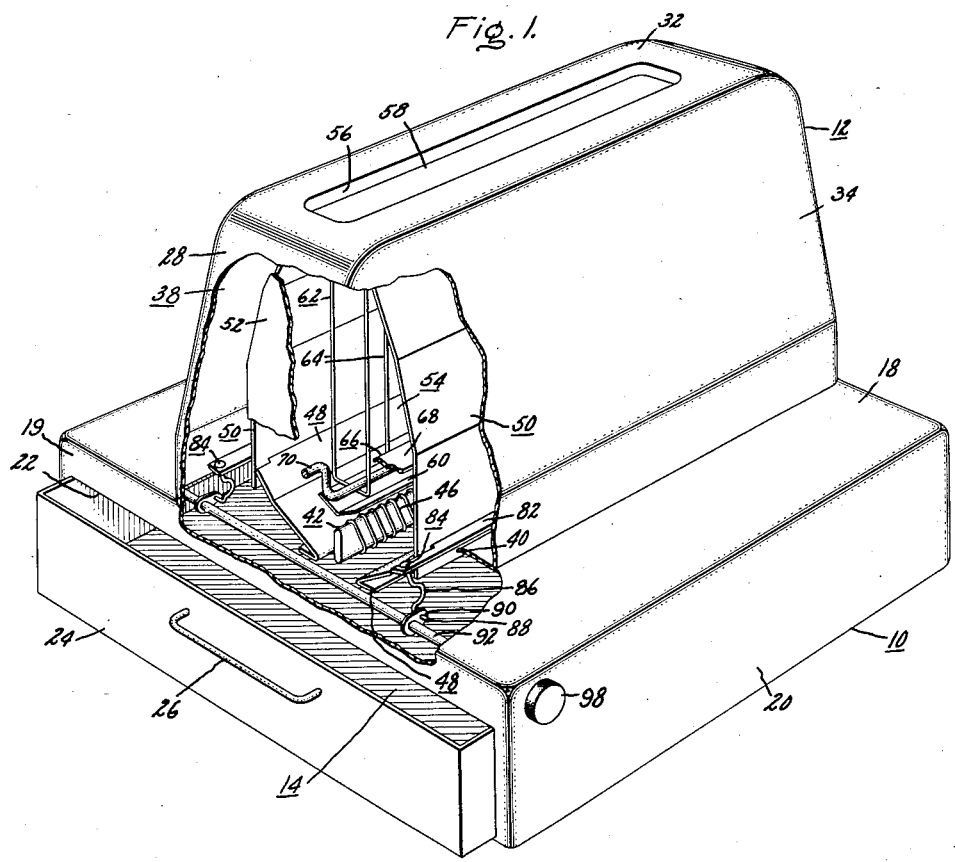
Figure 1 is a perspective view of one embodiment of my invention having portions broken away and shown in section for clarity.

Referring to the drawings the figures illustrate a combined cooking appliance which generally comprises an oven portion 10 and a toaster portion 12. The relative positions of these portions could be changed without departing from the spirit of the invention; the illustrated structural arrangement is, however, the preferred embodiment of my invention.

Figure 2:
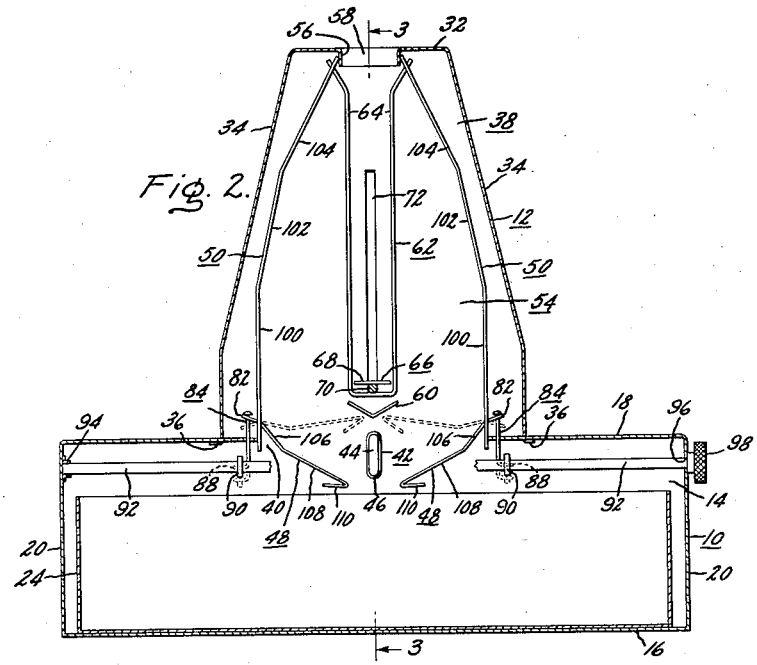
Figure 2 is a sectional view taken in a vertical plane that passes transversely through the cooking appliance.

Oven portion 10 comprises the oven chamber 14 which is formed by oven bottom wall 16, oven top wall 18, which are both flat, parallel and when disposed as illustrated in Figure 2 horizontal, oven front wall 19, parallel oven side walls 20, and oven rear wall 21, which are flat and when disposed as in Fig. 2 vertical. Opening 22 is formed in the oven front wall 19 and places the oven chamber 14 into communication with the atmosphere. Drawer 24 having an appropriate gripping handle 26 is mounted in the oven chamber 14 and is removable by sliding through the opening 22.

In Figure 1 it will be seen that the oven side walls 20 extend upwardly to where they join the oven top wall 18. Oven front wall 19 and oven rear wall 21 also extend upwardly to the point where they join oven top wall 18, however, both of these walls have central extensions 28 and 30, respectively, which extend upwardly beyond top wall 18 for a considerable distance to where they merge with the toaster top wall 32. Extensions 28 and 30, which constitute toaster end walls, are connected along their vertical sides to toaster side walls 34, which are shaped as illustrated and are appropriately connected at their top sides to toaster top wall 32 and at their lower edges to the oven top wall 18. In Figure 2 the bottom connection is illustrated as being formed by tabs 36, which pass through slots (not shown) in the oven top wall 18, and are bent to connect the parts in a conventional manner. Other equivalent connections can be employed.

From the foregoing it will be observed that to the extent that it has been described thus far, this combination cooking appliance comprises the oven chamber 14, which is formed by the oven bottom wall 16, oven top wall 18, oven front wall 19, oven back wall 21 and oven side walls 20, and the toasting chamber 38 which is formed by the toaster end walls 28 and 30, the toaster side walls 34 and the toaster top wall 32.

The oven chamber 14 communicates with the toaster chamber 38 through a substantial, longitudinally disposed opening 40 in the oven top wall 18. Opening 40 is of less length than the oven top wall 18 and has positioned centrally thereof a longitudinally extending heater 42. Heater 42 comprises an elongated bar 44 of insulating material, such as porcelain, having a heater wire 46, such as the known electrical resistance variety, wound about it. Though not illustrated, appropriate electrical wiring is provided which forms a circuit which includes the heater wire 46 in it so that the heater 42 may be energized when desired. The details of this circuit and the control therefor are known and not pertinent to my invention and, therefore, will not be described.

One of the salient features of my invention is the manner in which the single heater 42 is utilized to direct thermal energy to either the toasting chamber 38 or the oven chamber 14 for the purposes respectively of either (1) toasting an object placed in the toasting chamber to a uniform color or (2) warming, grilling or toasting an object placed in the oven chamber. This is accomplished by the employment of my novel flaps 48, which are so designed and mounted that they may selectively be positioned to direct the thermal energy emitted from the heater 42 either upwardly into the toasting chamber, or downwardly into the oven chamber.

Each of the flaps 48 is bent substantially as illustrated in the drawings out of flat heat reflecting material and hinged at its outer longitudinal edge to the lower portion of one of the side reflector walls 50. Walls 50 together with end reflector panels 52 define a toasting space 54 in the toasting chamber 38. Walls 50 and panels 52 are also formed of material that is a good heat reflector. The bottom portions of reflector walls 50 are secured to the oven top wall 18 in any conventional manner (not shown), and the vertical side edges of walls 50 are connected to the end panels 52 in any conventional manner. The lower edges of walls 50 and panels 52 define an opening that is coextensive with opening 40. The upper edges of the reflector walls 50 and the end panels 52 are positioned around a downwardly extending flange 56 which is formed about an elongated central slot 58 in the toaster top wall 32. Slot 58 permits the insertion and removal of sliced objects to be toasted in the toasting space 54.

Mounted within the toasting space 54 above the heating member 42 is an elongated, V-shaped baffle 60. Above baffle 60 in the toasting space is mounted a food guard 62 which comprises a plurality of U-shaped, guard wires 64 that are attached at their upper ends to the upper portions of the side reflector walls 50. Mounted for vertical movement within the food guard 62 is the food rack 66 which comprises an elongated flat plate 68 and the control rod 70. Control rod 70 is slidably guided in aligned, vertical slots 72 which are formed in the reflector end panels 52. At one of its ends, control rod 70 has an enlargement 74 formed which contacts one side of its associated end panel 52 adjacent to slot 72, and its other end is bent at 76 and extends through a slot 78 in the extension 28 to the exterior of the appliance casing and has a control knob 80 secured at its free end.

The thickness of objects that can be placed on food rack 66 is limited by the width of slot 58 and food guard 62. The food rack 66 has been illustrated merely as being mounted for manual vertical movement. The specific manner in which the bread rack moves between its lower toasting position, that shown in the drawings, to its upper non-toasting position in which the rack is near the top of the toasting space so objects may be removed or placed upon the rack, forms no specific part of this invention. Many known automatic arrangements for raising or lowering the rack, and means for controlling the time at which raising occurs may be employed. These means form no specific part of my invention and, therefore, will not be described in detail.

As was previously mentioned, the flaps 48 are hinged to the lower portions of side reflectors 50 and may be positioned to direct thermal energy to either the toasting chamber or the oven chamber. The flaps are pivotally movable between two major positions; the first position wherein they reflect the thermal energy from the heater 42 upwardly into the toasting space 54 (shown in full lines in Fig. 2), and the second position in which they reflect the thermal energy from the heater 42 downwardly into the oven chamber 14 (shown in dotted lines in Fig. 2). When in either position, the flaps 48 are the equivalent of a bent reflector wall disposed as a shallow V. In order to control and permit selection of the position of the flaps, a mechanical arrangement is illustrated in the drawings. However, it should be clearly understood that other mechanical arrangements may be employed, and that the one which is illustrated and about to be described is merely exemplary of the type of control mechanism.

The flaps 48 have edge portions 82 which project outwardly from the toasting space 54 through appropriate openings in the side reflector walls 50. Headed wire links 84 pass through appropriate openings in extending portions 82, and project generally downwardly. Links 84 are curved intermediate their ends at 86 and bent normal to the major plane of the links at their lower ends 88. Their bent ends 88 are rotatably received in eccentric portions of cams 90 which are supported by flap control rod 92. Flap control rod 92 extends transversely across the upper portion of the oven chamber 14 at the front end thereof adjacent front wall 19 and is rotatably secured in end bearing 94 formed on the inner side of one of the oven side walls 20, and opening 96 formed in the other oven side wall 20 through which it extends to the exterior of the appliance. Intermediate its ends within the oven chamber, flap control rod rigidly supports spaced cams 90. Flap control knob 98 is secured to the free end of flap control rod 92 and is accessible from the exterior of the appliance.

Figure 3:
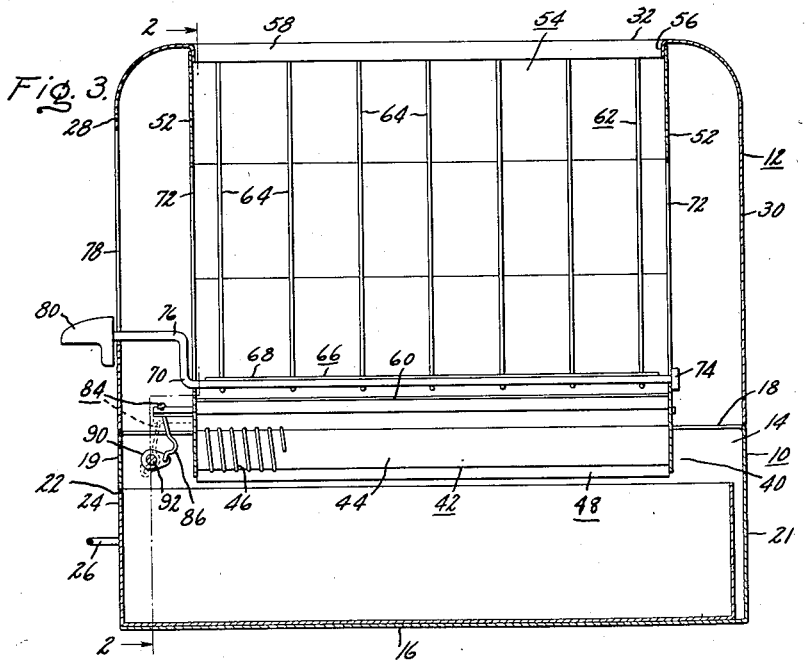
Figure 3 is a sectional view taken substantially on line 3—3 of Figure 2.

The foregoing mechanical arrangement for controlling the flaps operates in the following manner: When the flaps are in their lower position, shown in full lines in Figure 2, the relative positions of a link 84, a cam 90 and the flap control rod 92 are shown in Figure 3 in full lines. In this position the force of gravity acting on the flaps maintains the flaps in position. As was previously mentioned, this is the toasting position of the flaps wherein the thermal energy emitted by the heater 42 is reflected upwardly into the toasting space 54. When it is desired to utilize the appliance as an oven, it is merely necessary to rotate the flap control knob 98 in a clockwise direction, which causes the flap control rod 92 and cams 90 to simultaneously rotate clockwise until the curved portions 86 of the links 84 closely embrace the portions of the rod 92 adjacent to the cams (shown in dotted lines in Figure 3). During this movement, the flaps are simultaneously pivoted about their hinge axes to their upper oven position (shown in dotted lines in Figure 2) and when in their upper position, the thermal energy from the heater 42 will be reflected downwardly into the oven chamber. With the mechanical arrangement illustrated the flaps are maintained in their upper position by the locking effect of the curved portions 86 of the links 84 which cooperate with the control rod 92.

The manner in which the thermal energy emitted by the heater 42 is dispersed throughout the appliance will now be described in detail. A diagrammatic representation of one form of the appliance and the thermal ray dispersal pattern which is produced within the appliance when the heater 42 is energized is shown in Figure 4. The diagrammatic representation of the heat rays on the left-hand side of Fig. 4 have been made in dot-dash lines and are intended to symbolize the manner in which the thermal energy is dispersed throughout the toasting space 54 when the flaps are in their lower position. It should be understood that the heat rays will be dispersed in the right-hand side of the appliance in a similar manner. It will be observed that when the flaps are in this position the thermal energy from the heater 42 reaches the object F on the food rack 66 solely by reflected energy. The upwardly emitted rays from heater 42 are reflected away from the underside of the object F by the baffle 60. Some of the downwardly emitted rays strike the upper side of the flaps 48 and are reflected upwardly either against the side reflector walls 50 or against the object F, while other rays are emitted directly against the side reflector walls 50. With this arrangement, all of the rays are reflected substantially as illustrated and ultimately reach the object F and toast it to a uniform color.

The configuration and disposition of the side reflector walls 50, heater 42 and the flaps 48 produce this highly desirable energy dispersal pattern (see Figures 2 and 4). Each of the side reflector walls 50 comprises a lower, flat vertical section, an intermediate, flat, inclined section (illustrated as being approximately 12 degrees from a vertical plane) and an upper, flat, further inclined section (illustrated as being inclined to a vertical plane by 27 degrees). These sections are labelled 100, 102 and 104, respectively, and are each approximately one-third the height of the walls 50. The flaps 48 are bent as shown and comprise two sections 106, 108 and reversely bent portion 110. Section 106 is roughly one-half the length of section 108, and portion 110 slightly shorter than section 106. When in the lower toasting position, the flap sections are disposed as follows: Section 106 is inclined 38 degrees to a vertical plane, section 108 is inclined 64 degrees to a vertical plane, and reversely bent section 110 is inclined 20 degrees to the plane of section 108. Each of the mentioned angles is measured as indicated in Figure 4. With the flaps and reflector side walls configured and disposed as described, the reflected thermal energy is distributed uniformly over both sides of the object F placed on the food rack 66 for toasting.

It has been found in practice that with the angular relationship set forth above, and shown in Fig. 4, one specific dimensional relationship of reflector wall sections and flap sections which have produced excellent results with a heater ⅝" in cross-sectional height which is disposed so as to lie vertically centrally between the limits of movement of the free edges of flaps 48, the upper limit being determined by disposing the flap sections 106 at an angle 81 degrees to a vertical plane and the lower limit being the lower toasting position of the flaps, and horizontally equi-distant between the side walls 50 is as follows:

| | Inches |
|---|---|
| Section 100 | 2¹⁄₃₂ |
| Section 102 | 1²⁷⁄₃₂ |
| Section 104 | 1¹⁵⁄₁₆ |
| Section 106 | ½ |
| Section 108 | 1⅛ |
| Section 110 | ⅜ |

It should be realized, however, that the specific geometrical relationship of the heater, reflector wall sections and flap sections set forth and illustrated in Figure 4 is not critical, but merely exemplary of an optimum arrangement. Reasonable variations in the angular and dimensional relationship may be made without materially adversely affecting performance and, of course, the overall size of the appliance may be varied as long as the geometric proportions are maintained.

The foregoing toasting space arrangement is made up exclusively of flat sections and is relatively simple as compared with complicated prior art, reflector wall structure, which usually included critical curved surfaces which were difficult to manufacture. In view of the fact that all of the thermal ray energy which reaches the object F on the rack is reflected, it is not necessary to attempt to delicately balance the directly radiated energy and reflected energy, as is the case in many prior art devices. Another advantage of the toasting space arrangement is that it takes advantage of the natural convection currents of air heated by the heater to increase the ambient temperature in the toasting space. Still another advantage is that the heater is completely protected from probing attacks of the appliance user, due to the fact that it is positioned in a completely inaccessible location. Lastly, this arrangement permits the simplification of a toasting chamber construction, reduces the number of component parts and thereby reduces manufacturing costs.

The right-hand side of Figure 4 illustrates the manner in which the thermal energy is dispersed when the flaps are in their upper position. The thermal rays which emanate directly from the heating member 42 and those which are reflected by the underside of flaps 48 are shown in dot-dash lines in this view. It will be observed that when the flaps are in their upper position, the rays are distributed throughout the oven chamber and that the reversely bent section 110 of the flaps 48 assist in accomplishing this. In practice it has been found that when the flap sections 106 are inclined to a vertical plane at an angle of 81 degrees, the thermal energy is effectively disseminated throughout the oven chamber. As was previously mentioned, this angle determines the upper limit of the free edges of flaps 48, which limit is one of the reference points for vertically locating the heater 42.

After a careful consideration of the foregoing, it will become apparent that one aspect of my invention resides in the provision of a combination cooking appliance having a toasting chamber with a unique toasting space, an oven chamber, a single heater and novel means for directing the thermal energy produced by the heater to either the toasting space or the oven chamber. As was previously stated, various means can be used for controlling the food rack and other mechanical arrangements can be substituted for the specific flap control arrangement illustrated without departing from the spirit of the invention. This aspect of my invention satisfies all the objects of my invention. My appliance may be used as a toaster when the flaps are in their downward position or as an oven when the flaps are in their upper position. When used as a toaster it consistently toasts objects to a uniform color. When used as an oven, objects of various thicknesses may be toasted by placing them in the oven drawer 24 due to the fact that the depth of the oven drawer is made greater than the thickest object which can be accommodated in the toaster chamber. When used as an oven, objects may be toasted, grilled or kept warm, simply by sliding out the drawer, placing the objects in the drawer and sliding the drawer back into position in the oven chamber. The warming may be accomplished by the residual heat from a prior toasting operation, or preferably by controlling the heater so as to intermittently energize it for short periods of time to produce a warming effect. The specific manner of controlling the heater to intermittently energize it forms no specific part of my invention and, therefore, will not be described in detail.

A broader aspect of my invention resides simply in the provision of a toasting chamber generally, an oven chamber, a heater and means for directing the thermal energy produced by the heater to either chamber; this combination constitutes a combination cooking appliance which may be used as a toaster or an oven. This satisfies some of the objects of my invention in that it affords the desired attributes of (1) accommodating objects thicker than conventional sliced bread, and (2) providing a warming oven feature.

A further aspect of my invention resides in the provision of an improved toaster having a unique toasting space. This comprises the combination of the novel reflector walls and flaps, the latter being fixed in their lower position. This aspect satisfies some of the objects of this invention in that it provides a simple, inexpensive toaster which consistently toasts to a uniform color.

One of the salient features of my invention that permeates all of its aspects is its structural simplicity, inexpensiveness and operating efficiency.

As will be evident from the foregoing description certain aspects of my invention are not limited to the particular details of construction of the example illustrated, and I contemplate that various and other modifications and applications will occur to those skilled in the art. It is, therefore, my intention that the appended claims will cover such modifications and applications as do not depart from the true spirit and scope of my invention.

What I claim as new and desire to secure by Letters Patent of the United States is:

1. In an electrical cooking appliance, walls defining a toasting chamber, an oven chamber, and an opening therebetween, said chambers being in communication with each other through said opening, an electrical heater adapted to produce thermal energy when energized disposed in said opening, means in said toasting chamber for supporting food objects to be toasted, means in said oven chamber for supporting food objects to be cooked, a pair of reflector plates disposed adjacent to said opening, said reflector plates being independently hinged near opposite sides of said opening and arranged for joint pivotal movement between one position wherein they reflect the thermal energy produced by said electrical heater substantially only to said toasting chamber and another position wherein they reflect the thermal energy produced by said electrical heater substantially only to said oven chamber, and manually operable means for jointly moving said reflector plates into either position, whereby said appliance may be selectively utilized to either toast food objects supported in said toasting chamber or cook food objects supported in said oven chamber.

2. In a cooking appliance, a toasting space comprising a pair of spaced side reflector walls, said side reflector walls comprising substantially parallel normally vertically extending flat sections, intermediate converging flat sections, and additional more sharply converging flat sections, a heater for producing thermal energy disposed between said substantially parallel flat sections, a rack for supporting food objects to be toasted spaced from and normally above said heater, a heat baffle disposed between said heater and said rack and arranged to shield a food object placed on said rack from the direct thermal energy produced by said heater, and a shallow V-shaped bent reflector wall normally disposed below said heater and arranged to reflect the thermal energy produced by said heater which impinges upon it solely toward said side reflector walls, whereby the thermal energy produced by said heater is uniformly reflected to the exposed surfaces of a food object positioned on said rack and the food object receives only reflected thermal energy.

3. A device as defined in claim 2 wherein said side reflector wall sections are each approximately one-third of the length of said side walls.

4. A device as defined in claim 2 wherein said intermediate sections are inclined at angles of approximately 12 degrees to the planes of said substantially parallel sections and said more sharply converging sections are inclined at angles of approximately 27 degrees to said planes, and said bent reflector wall comprises two legs, each of which is formed by two sections, a first section inclined at an angle of approximately 38 degrees to planes parallel to the planes of said substantially parallel sections, and a second section inclined at an angle of approximately 64 degrees to plane parallel to the planes of said substantially parallel sections.

5. A cooking appliance comprising walls defining an oven chamber, a toasting chamber, and an opening between said chambers which places said chambers in communication with each other, means in said toasting chamber for supporting food objects to be toasted, means in said oven chamber for supporting food objects to be cooked, a pair of heat reflecting flaps independently hinged to said walls at portions thereof which are adjacent to said opening, a heater adapted to produce thermal energy when energized disposed centrally in said opening between said flaps, said flaps being jointly pivotally mounted between a first position in which they substantially close said opening to complete the oven chamber with the heater positioned therein whereby the thermal energy produced by the heater is directed by said flaps substantially only into said oven chamber, and a second position in which said flaps direct the thermal energy produced by said heater substantially only into said toasting chamber, and manually operable means for jointly moving said flaps into either position, whereby said cooking appliance may be selectively utilized to either toast food objects supported in said toasting chamber or cook food objects supported in said oven chamber.

6. A device as defined in claim 5 wherein said heater comprises an elongated member, and said flaps comprise elongated plates of a good energy reflecting material that are pivotal about horizontal axes.

7. A device as defined in claim 5 wherein said toasting chamber comprises a toasting space formed by a pair of spaced side reflector walls which have substantially parallel flat sections, intermediate converging flat sections and more sharply converging flat sections and wherein said heater is positioned between said substantially parallel sections.

8. A cooking appliance comprising walls defining an oven chamber, a toasting chamber, and an opening between said chambers which places said chambers in communication with each other, a heater in said opening, a pair of flaps adapted to pivot between a first position in which they substantially close said opening to complete the oven chamber with the heater positioned therein whereby the thermal energy produced by said heater is directed substantially only into said oven chamber, and a second position in which they direct the thermal energy produced by said heater substantially only into said toasting chamber, said heater comprising an elongated member, said flaps comprising elongated plates of good energy reflecting material that are pivotal about horizontal axes, and means for positioning objects in said toasting chamber, said toasting chamber comprising a toasting space formed by a pair of spaced side reflector walls which have substantially parallel flat sections, intermediate converging flat sections and additional more sharply converging flat sections, said heater being positioned between said substantially parallel sections and said flaps being disposed to generally form a shallow V when in said second position whereby they reflect the thermal energy which is produced by said heater and which impinges upon them toward said side reflector walls.

9. A device as defined in claim 8 wherein said intermediate converging sections are inclined at angles of approximately 12 degrees to the planes of said substantially parallel sections, and said more sharply converging sections are inclined at angles of approximately 27 degrees to said planes.

10. A device as defined in claim 9 wherein each of said flaps is bent into two flat sections which are disposed when in said first position so that the first section is inclined at an angle of approximately 38 degrees to a plane parallel to said substantially parallel sections and the second section is inclined at an angle of approximately 64 degrees to said last mentioned plane.

11. A device as defined in claim 10 wherein said second sections are disposed at angles of 81 degrees to planes parallel to said substantially parallel sections when said flaps are in said second position.

12. A device as defined in claim 11 wherein said heater is positioned centrally in said opening midway between the limits of movement of said flaps.

(References on following page)

References Cited in the file of this patent

UNITED STATES PATENTS

| | | | |
|---|---|---|---|
| 1,443,546 | Mieville | Jan. 30, | 1923 |
| 1,539,734 | Hauber | May 26, | 1925 |
| 1,587,023 | Mottlau | June 1, | 1926 |
| 1,751,219 | Seamon | Mar. 18, | 1930 |
| 1,862,733 | Wright | June 14, | 1932 |
| 2,025,898 | Rhodes | Dec. 31, | 1935 |
| 2,262,498 | Holm Hansen | Nov. 11, | 1941 |
| 2,368,026 | Jepson | Jan. 23, | 1945 |
| 2,413,447 | Greene | Dec. 31, | 1946 |
| 2,422,450 | Van Daam | June 17, | 1947 |
| 2,465,577 | Cox | Mar. 29, | 1949 |